US012717851B1

(12) United States Patent
Tong et al.

(10) Patent No.: US 12,717,851 B1
(45) Date of Patent: Aug. 25, 2026

(54) CREATING IMMUTABLE CONDITIONAL LOGIC RECORDS FOR GENERATED DOCUMENTS

(71) Applicant: People Center, Inc., San Francisco, CA (US)

(72) Inventors: Veronica Ho Ka Tong, Austin, TX (US); Sandesh Chandrashekar, Medford, MA (US); Derek Sifford, Detroit, MI (US); Jiaying Liu, San Francisco, CA (US); Parshwa Mehta, San Francisco, CA (US)

(73) Assignee: People Center, Inc., San Francisco, CA (US)

( * ) Notice: Subject to any disclaimer, the term of this patent is extended or adjusted under 35 U.S.C. 154(b) by 0 days.

(21) Appl. No.: 19/353,579

(22) Filed: Oct. 8, 2025

(51) Int. Cl.
*G06F 16/93* (2019.01)
*G06F 40/186* (2020.01)

(52) U.S. Cl.
CPC ............ *G06F 16/93* (2019.01); *G06F 40/186* (2020.01)

(58) Field of Classification Search
CPC ............................... G06F 16/93; G06F 40/186
See application file for complete search history.

(56) References Cited

U.S. PATENT DOCUMENTS

2015/0339285 A1* 11/2015 Safaei .................. G06Q 10/107 715/256
2016/0246545 A1* 8/2016 Yokoi .................. G06F 3/0667
2022/0207005 A1* 6/2022 Chenthamarakshan .................... G06F 16/22
2023/0087384 A1* 3/2023 Matthews ............ G06Q 20/405 711/3
2024/0331429 A1* 10/2024 Chattopadhyaya .... G06V 30/36
2024/0362194 A1* 10/2024 Roberts ............... G06F 16/2379
2025/0068629 A1* 2/2025 Chaudhary ....... G06F 16/24573
2025/0370593 A1* 12/2025 Dasdan ............... G06F 16/9558

* cited by examiner

*Primary Examiner* — Dangelino N Gortayo
(74) *Attorney, Agent, or Firm* — Dority & Manning, P.A.

(57) ABSTRACT

Provided are computing systems and methods designed to enable bulk document generation while creating immutable logic records. A document generation system receives a bulk document request, wherein the bulk document request comprises request metadata. The system accesses one or more document templates, wherein at least one of the one or more document templates include conditional content. The system filters the one or more document templates based on the request metadata. The system generates a plurality of documents based on the one or more document templates, wherein each document in the plurality of documents is intended for delivery to a particular document recipient in one or more document recipients. The system transmits the plurality of documents to one or more document recipients.

20 Claims, 7 Drawing Sheets

CREATING IMMUTABLE CONDITIONAL LOGIC RECORDS FOR GENERATED DOCUMENTS

FIELD

The present disclosure relates generally to computer-implemented document management systems, and more specifically to systems and methods for generating documents from templates.

BACKGROUND

Some computer-implemented document generation systems may be used to generate documents that include or exclude specific content based on a recipient's attributes, such as employment status or location. In some approaches, an administrator may create and maintain a separate document template for each possible variation. This can lead to a proliferation of similar templates, which may increase data storage requirements and administrative overhead. The process of searching, indexing, and retrieving a correct template from a large and potentially redundant dataset can be computationally inefficient and may increase the possibility of an administrator selecting an incorrect template version.

Furthermore, challenges can relate to data integrity and performance. For example, when a document template is modified, some systems may not preserve a record of the specific conditional logic that was applied when a particular document was generated. Re-rendering a historical document after a rule within a template has changed may not reflect the content as it was originally presented to the recipient, which can affect an audit trail. In some systems, complex conditional rule strings may be embedded directly into the body of a template. This can involve computationally intensive text-parsing operations to find and evaluate these rules for each document, which may increase central processing unit (CPU) utilization and processing latency, particularly in bulk generation scenarios.

SUMMARY

Aspects and advantages of embodiments of the present disclosure will be set forth in part in the following description, or can be learned from the description, or can be learned through practice of the embodiments.

Aspects of the present disclosure relate to a computer-implemented method. The method can be implemented by a computing system comprising one or more processors. The method comprises receiving a bulk document request, wherein the bulk document request comprises request metadata. The method further comprises accessing one or more document templates, wherein at least one of the one or more document templates include conditional content. The method further comprises filtering the one or more document templates based on the request metadata. The method further comprises generating a plurality of documents based on the one or more document templates, wherein each document in the plurality of documents is intended for delivery to a particular document recipient in one or more document recipients. The method further comprises transmitting the plurality of documents to the one or more document recipients.

Aspects of the present disclosure further relate to a computing system. The computing system comprises one or more processors and one or more non-transitory computer-readable media storing instructions that are executable by the one or more processors to cause the computing system to perform operations. The operations comprise receiving a bulk document request, wherein the bulk document request comprises request metadata. The operations further comprise accessing one or more document templates, wherein at least one of the one or more document templates include conditional content. The operations further comprise filtering the one or more document templates based on the request metadata. The operations further comprise generating a plurality of documents based on the one or more document templates, wherein each document in the plurality of documents is intended for delivery to a particular document recipient in one or more document recipients. The operations further comprise transmitting the plurality of documents to the one or more document recipients.

In yet another aspect, the present disclosure relates to one or more non-transitory computer-readable media storing instructions that are executable by one or more processors to cause a computing system to perform operations. The operations comprise receiving a bulk document request, wherein the bulk document request comprises request metadata. The operations further comprise accessing one or more document templates, wherein at least one of the one or more document templates include conditional content. The operations further comprise filtering the one or more document templates based on the request metadata. The operations further comprise generating a plurality of documents based on the one or more document templates, wherein each document in the plurality of documents is intended for delivery to a particular document recipient in one or more document recipients. The operations further comprise transmitting the plurality of documents to the one or more document recipients.

Other example aspects of the present disclosure are directed to other systems, methods, apparatuses, tangible non-transitory computer-readable media, and devices for performing functions described herein. These and other features, aspects, and advantages of various implementations will become better understood with reference to the following description and appended claims. The accompanying drawings, which are incorporated in and constitute a part of this specification, illustrate implementations of the present disclosure and, together with the description, help explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
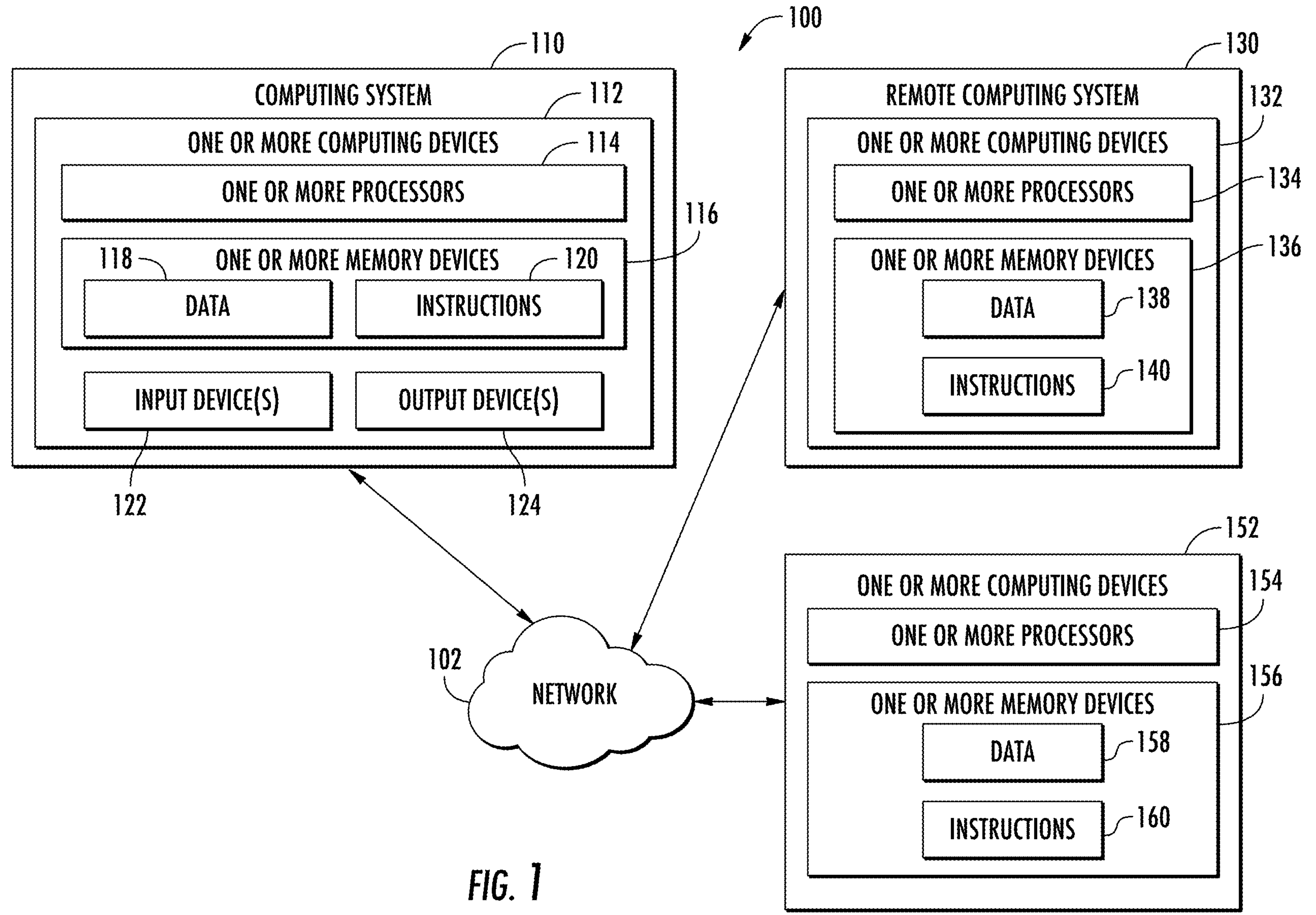
FIG. 1 depicts a block diagram of an example environment, including a computing system that performs operations according to example embodiments of the present disclosure.

Reference numerals that are repeated across plural figures are intended to identify the same features in various implementations.

DETAILED DESCRIPTION

Example aspects of the present disclosure are directed to computing systems and methods designed to generate documents in response to a bulk document request. Example implementations relate to systems and methods for dynamically generating and transmitting customized documents to a plurality of recipients. In some embodiments, a system may receive a bulk document request, access one or more document templates that include conditional content, filter the templates based on metadata associated with the request, and generate a plurality of documents. The documents may be generated by evaluating the conditional content for each intended recipient. The generated documents, each customized for its respective recipient, can then be transmitted.

Some document management systems may not support conditional rendering of content within a single document template. This can lead administrators to create and maintain multiple, similar copies of a document to account for variations, such as including a specific clause for employees in a particular state or with a certain job classification. Such an approach can increase administrative overhead and the risk of sending incorrect information. The disclosed systems and methods address certain technical challenges by providing a framework where conditional logic may be associated with a single primary template, which can reduce the need for certain redundant document versions.

In some implementations, conditional rules may be decoupled from the static document text and programmatically linked within a template structure. A template can contain one or more placeholders that reference separate conditional objects. A conditional object may define a logical rule based on one or more attributes of a potential document recipient. When a document is generated for a particular recipient, a document engine can evaluate these rules against the recipient's specific attribute data. Based on the outcome of the evaluation, the engine may dynamically include or omit the corresponding blocks of content in the final document, facilitating customization from a single template source.

In various embodiments, a process may begin by identifying a set of recipients for a document distribution. For each recipient, the system may select an appropriate document template from a library by filtering based on recipient attribute data, such as their role, location, or organization. During the generation of a specific document for a recipient, the system can parse the selected template and evaluate any associated conditional clauses. These clauses may be defined as independent, reusable objects referenced by multiple templates and can be checked against the recipient's attributes. If a clause's conditions are satisfied, the associated content may be rendered into the final document. To facilitate the maintenance of an accurate record, a new, immutable instance of the conditional object can be created and associated with the generated document, which may assist in preserving the logic applied at the time of creation.

The disclosed technology relates to a computer-implemented method, system, and non-transitory computer-readable medium for the dynamic and scalable generation of customized documents. The process may be initiated when a computing system, which may be a server, a personal computer, or a distributed computing environment, receives a bulk document request. In some embodiments, this bulk document request may be a command initiated by a user, such as a human resources administrator, or an automated system trigger, instructing the system to prepare and distribute one or more documents to a plurality of recipients. The request may comprise request metadata, which can contain information for the system to execute the document generation and distribution task. This metadata can include, for example, a list of recipients to whom the documents are to be sent. For each recipient, the request metadata may include detailed attribute data. This attribute data can serve as a basis for both selecting appropriate documents and for customizing their content. In some examples, the request metadata can include information provided by the user who generated the bulk document request. For example, an administrator can include a location and role for each recipient in the list of recipients.

The attribute data associated with each recipient can provide a structured profile that the system can leverage for logical operations. For instance, the attribute data for a respective recipient may include a geographic location of the recipient, an organization or department to which the recipient belongs, and a specific role or job title of the recipient. In scenarios involving employment documents, this attribute data could also encompass employment status (e.g., full-time, part-time, contractor), exemption status under labor laws (such as the Fair Labor Standards Act), pay rate, or tenure.

In some implementations, where each recipient is associated with a specific organization, the attribute data may include the location of that organization, which can be distinct from the recipient's personal work location and may be used to satisfy different jurisdictional requirements. Information about the organization can also include information about the organization's type (e.g., for profit business, non-governmental organization (NGO), governmental organization, and so on), information about the organization's structure, information about the organization's processes, and so on. The request metadata may also include a description of one or more document types to be transmitted, such as "Offer Letter," "Employee Handbook," or "Non-Disclosure Agreement," which can guide the initial selection of relevant templates.

Upon receiving a bulk document request and its associated metadata, the system can access a data store containing one or more document templates. These may be primary patterns that can include conditional content. Each template may have its own associated metadata, such as a document type, a jurisdiction, or an intended audience, which can facilitate a preliminary filtering process. The system can then filter the one or more document templates based on the request metadata. This filtering process may be performed for each respective recipient in the plurality of recipients. The system can determine appropriate document templates for a given recipient by comparing the attribute data associated with that recipient against the metadata of the templates or against a set of predefined document rules. For example, a rule might state that all employees in California should receive a template of the "Proprietary Information and Inventions Agreement" type that includes California-specific legal language.

The filtering process may involve multiple stages. First, for a respective recipient, the system may determine the specific document types that need to be sent based on instructions in the bulk request. For each of these document types, the system can then identify available document templates that are associated with that document type. From this subset of templates, the system can perform a more granular selection. The system can determine at least one metadata value associated with the respective recipient, such as their state of residence being "New York" or their employee classification being "FLSA Exempt." The system can then select a particular document template from the subset that has an associated metadata value that matches the recipient's metadata value. This multi-factor filtering can facilitate the selection of an appropriate base template for each recipient before content-level customization occurs. For example, for a single request to send offer letters to three new hires in New York, California, and Texas, the system could select three distinct offer letter templates, each tailored to the legal requirements of the respective state.

As part of the filtering process, the system can analyze specific conditional clauses within particular documents. For example, document variables and custom fields may also include filtering metadata (e.g., by listing applicable countries, document types (e.g., offer letters, termination agreements, etc.), and domains such as external recruiting and internal HRIS). This information can be used, in combination with template data, to determine an appropriate template for a particular user, organization, or event. In this way, the system can first filter the templates based on template level information (e.g., metadata associated with the template as a whole), and then evaluate data associated with clauses, variables, and fields within each template to determine whether it is appropriate for the current user/event.

After an appropriate template is selected for a recipient, the system can begin the process of generating a specific, personalized document. One aspect of the disclosed technology relates to the manner in which conditional content is handled. Within a document template, certain sections of text or clauses may be designated as conditional. This may be achieved by associating the conditional content with a conditional clause. A conditional clause can be a logical construct that describes one or more recipient attributes and is evaluated by a conditional evaluation system. The output of the conditional evaluation system can instruct a document engine whether to include the associated content based on an evaluation of the recipient's specific attributes. For example, a conditional clause might be defined by a logical formula, such as a domain-specific query language string, that evaluates to true if a recipient's employment_status attribute is 'exempt' and work_location attribute is 'California.' When a document engine processes the template for that recipient, it can evaluate this conditional clause. If the conditions are met, the associated content may be rendered into the final document; otherwise, it may be omitted.

In some embodiments, a conditional clause is represented as an independent, reusable object that is stored separately from any particular document template. This architectural choice can provide certain advantages in terms of management, scalability, and performance. Instead of embedding a potentially long and complex logical rule string directly into the template text, a template may comprise a lightweight reference to the independent conditional clause object. This reference could be a unique identifier (ID) or a globally unique identifier (UUID). For example, the template text might contain a specific syntax, such as {# if <ClauseCondition.id>} preceding the conditional content block and {/if} after it, where <ClauseCondition.id> is the unique ID of the separately stored conditional clause object. This decoupling can allow a single conditional clause, such as one for at-will employment, to be created once and then referenced by multiple different document templates, which can simplify updates and promote consistency. This structure can also support nested conditional clauses, where one block of conditional content can itself contain another conditional clause with its own distinct logic, to enable the creation of highly complex and granular document variations from a single template.

The generation of the final output document may involve a multi-step evaluation process. For a given recipient, the system can first determine an appropriate document template. The system can then parse this template and identify any particular conditional clauses referenced within it. For each identified clause, the system can determine whether an attribute or set of attributes associated with the respective recipient (or their organization) satisfies the logic defined in that conditional clause. In an instance where the recipient's attributes satisfy the conditional clause, the system can generate an output document that includes the block of conditional content associated with that clause. If the attributes do not satisfy the conditional clause, the content block may be excluded. This evaluation may be performed for all conditional clauses in the template, and the results can be used to assemble the final, customized document text.

To promote long-term data integrity and provide a reliable audit trail, a step may be performed during the generation of an output document. When a conditional clause from a template is satisfied and its content is to be included, the system can generate a new, immutable object that is specific to that unique output document. This new object can act as a "snapshot" or a point-in-time copy of the conditional clause as it existed at the moment of document creation. This immutable object may contain the same logical formula and metadata as the original template-level clause. A reference within the text of the newly created output document may then be modified to point to this new, document-specific immutable object, rather than the original, editable template-level object. This process can facilitate a verifiable link between the generated document and the exact version of the logic that was applied to it. Consequently, future edits or deletions of the conditional clause in the source template may not affect the content or audibility of documents that have already been generated, which can help preserve the document as a system of record.

In an alternative embodiment, conditional content and its associated logic may be managed using a different data structure, such as embedded documents within a parent document text object. In this implementation, the main body of the template text may not contain the conditional content itself, but rather a placeholder identifier. A parent document text object may contain a separate field, such as a list of embedded conditional clause documents. Each embedded document may contain the placeholder's identifier, a reference to a conditional clause object defining a rule, and the actual content to be rendered. During generation, the system can evaluate all the conditional clauses referenced in the embedded documents. For each placeholder found in the main text whose corresponding condition evaluates to true, the system can recursively replace the placeholder with the content from the associated embedded document. This approach can abstract the content out of the main text flow and can achieve a similar outcome of dynamically rendering content based on recipient-specific data.

Once the generation process is complete for each recipient in a bulk request, resulting in a plurality of documents each customized for its intended recipient, the system can proceed to the step of transmitting the documents. The transmission can be performed through various electronic channels. For example, documents may be sent as email attachments, embedded in the body of an email, delivered to a recipient's secure portal within a platform, or sent to a third-party electronic signature service. The system can manage this workflow, from receiving the initial request to confirming the transmission of generated documents, thereby providing a solution for certain complex document management challenges.

In a first example implementation, a computer-implemented system is configured to dynamically generate customized offer letters for a plurality of new hires. An administrator, using a computing device (e.g., a personal computer, a tablet), can initiate a bulk document request to send offer letters to a first recipient and a second recipient. Attribute data associated with the first recipient can indicate an employment classification of exempt and a work location of California. Attribute data for the second recipient can indicate an employment classification of exempt and a work location of Texas. The system accesses a document template for an offer letter. The template can be configured to manage regional and role-based variations.

Within a data store of the system, two independent conditional clause objects may be defined and stored separately from the template text. A first conditional clause object can contain a logical rule, which may be expressed in a query language. The rule may evaluate to true when a recipient's attribute for work location is 'California.' A second conditional clause object can contain a rule that evaluates to true when a recipient's attribute for employment classification is 'exempt.' The document template may include lightweight references to these independent objects. For example, a reference to the first conditional clause object can precede a block of text related to California-specific legal information. A reference to the second conditional clause object can precede a block of text detailing a bonus plan. During a generation process for the first recipient, a document engine of the system can parse the document template. The engine may evaluate the rule in the first conditional clause object against the first recipient's attributes, which can result in a 'true' evaluation. The engine can also evaluate the rule in the second conditional clause object, which can also result in a 'true' evaluation. The system can then generate two new, immutable objects as point-in-time snapshots of the first and second conditional clause objects. The new immutable objects may be associated with the specific output document being created for the first recipient, and the final document is rendered to include both the California-specific text and the bonus plan text.

For the second recipient, the system processes the same document template. The evaluation of the first conditional clause object may return 'false,' while the evaluation of the second conditional clause object may return 'true.' The system can generate a single new, immutable object as a snapshot of the second conditional clause object and can associate it with the second recipient's output document. The final document may be rendered to include the bonus plan text, while the California-specific text is omitted. An outcome of this process is the generation of multiple, customized documents from a single source template. This may reduce data storage needs and administrative overhead associated with managing numerous similar template files. Further, the creation of immutable, document-specific conditional objects can provide a verifiable audit trail, which may improve the integrity of each document as a system of record.

In a second example implementation, the system may be deployed in a multi-tenant environment. A first-level entity (e.g., a service provider) can provide services to a plurality of second-level entities (e.g., client companies). An administrator for the first-level entity may determine that employment agreements in a particular jurisdiction should include a new data privacy disclosure. The administrator can create a single new conditional clause at the first-level entity's level. This clause object can contain a logical rule that is satisfied if a document recipient's work location attribute matches the specified jurisdiction. The administrator can then modify a master employment agreement template by inserting a reference to this new conditional clause, followed by the disclosure text. Upon publication of the updated primary template, the system can propagate this change. For each second-level entity, the system may create a corresponding second-level conditional clause object. This object can be a protected, non-editable mirror of the first-level entity's primary condition, which may facilitate consistent application of the rule.

Subsequently, an administrator at a second-level entity can initiate a process to hire a new employee located in the affected jurisdiction. The system can access the second-level entity's employment agreement template, which may contain the reference to the propagated conditional clause. The document engine can evaluate the clause against the new employee's location attribute, and the condition may be satisfied. An output document can be generated that includes the data privacy disclosure. An outcome of this process is the deployment of a compliance-related update across multiple tenants from a centralized administrative action. This may improve the efficiency and reliability of managing document compliance in a multi-tenant architecture by including specified legal language where indicated by the conditional logic.

An example technical problem solved by example implementations of aspects of the present disclosure may include the inefficient management and scaling of document templates. In some conventional systems, to accommodate variations in document content for different recipients, such as including a specific clause for certain employees (e.g., administrators may create and maintain a complete, separate copy of a document template for each variation). This approach can lead to a significant increase in the number of templates as more conditional variations are introduced. Managing this large volume of near-identical templates may be a manually intensive and error-prone process for users, and it can also introduce technical challenges for the underlying computing system, such as increased data storage requirements and higher computational overhead for searching, indexing, and retrieving the correct template from a large and potentially redundant dataset.

Example implementations of aspects of the present disclosure may provide technical solutions to this problem by modifying the data structure for representing and generating documents. For example, a system may access a document template that includes conditional content, where the conditional logic is defined in a conditional clause that is represented as an independent object stored separately from any particular document template. The template text itself may not contain the complex conditional logic but instead may comprise a lightweight reference to the independent conditional clause object, as may be recited in claim 16. During document generation, a document engine may evaluate the referenced conditional clause based on attributes associated with a specific recipient and determine whether to include the associated conditional content. This approach may avoid the creation of redundant, full-text template copies. A resulting technical effect may be a more efficient and scalable document management system that can use less data storage by storing a single base template and a set of compact, reusable condition objects, rather than numerous duplicative templates. This data architecture can reduce the computational resources used for template management, retrieval, and processing.

Another example technical problem solved by example implementations of aspects of the present disclosure may include challenges in maintaining the data integrity and auditability of dynamically generated documents. In systems where document templates can be edited over time, a challenge can arise in preserving a generated document as a fixed, verifiable record of the content presented to a recipient at a specific point in time. If the conditional logic within a template is modified after a document has been generated or an attribute of a recipient changes, some conventional systems may not include a mechanism to link the sent document to the precise version of the conditional logic used at the time of its creation. This can affect the apparent content of historical documents when they are re-rendered, which can compromise the audit trail and introduce compliance or legal risks by affecting the reliability of the system as a system of record.

Example implementations of aspects of the present disclosure may provide technical solutions to this problem by generating an immutable, point-in-time record of the conditional logic used for each generated document. For instance, when generating a document, the system may identify a conditional clause within the source template, which is stored as an independent object. The system can generate a new, immutable object that is specific to the output document. This new object can function as a snapshot of the conditional clause from the template as it existed at the moment of generation. The system can update the generated document to reference this new, specific, and immutable object. A resulting technical effect may be a verifiable link between each individual document and the exact version of the conditional logic applied to it, thereby facilitating the integrity of the generated document. This can isolate the document from subsequent changes to the source template, which can support a more reliable audit trail and can improve the trustworthiness of the computing system.

Another example technical problem solved by example implementations of aspects of the present disclosure may include the high computational cost and processing latency associated with rendering documents that contain complex conditional logic. For instance, some implementations may embed complex rule strings, such as those based on a query language, directly within the body of a document template. To generate a document, a parsing engine may need to perform computationally intensive operations on the entire template text, such as complex text matching, to locate, extract, and interpret these potentially large and varied rule strings for each document being generated. This process can increase CPU utilization and introduce latency, particularly in a bulk generation scenario involving thousands of documents. Furthermore, duplicating the same large rule string across multiple templates or within a single template may lead to inefficient use of memory and storage resources.

Example implementations of aspects of the present disclosure may provide a technical benefit by modifying the process for parsing and evaluating conditional logic. A system may store the conditional logic, for instance, a formula from a query language, in an independent object, separate from the document template. The document template can contain a lightweight reference to this independent object. During the generation of a plurality of documents, a document engine may scan the template text for these simple, fixed-format references, which can be a faster and less resource-intensive operation than parsing complex, embedded rule strings. The system can then use these references to efficiently query and retrieve the corresponding conditional clause objects, evaluate their logic based on recipient attributes, and determine whether to include the conditional content. A resulting technical effect may be a reduction in the computational resources (e.g., CPU cycles and memory) used to generate documents. By abstracting the complex logic out of the text and into structured, referenced objects, the system can reduce certain string-parsing operations, which may reduce latency and facilitate more efficient batch processing, which may improve the performance and throughput of the document generation system.

In some examples, the disclosed technology can be used in a wide variety of use cases. In a first example use case, the system can enable a clinical trial management system to generate specific documentation for study participants across various sites and cohorts. A system could receive a request to produce forms for a new group of participants, with the system dynamically inserting content based on participant attributes. The system can receive, as input, a request to produce informed consent forms, with the request metadata containing attributes for each participant such as an assigned study arm (e.g., a first drug, a second drug, a placebo), an age bracket, and a legal jurisdiction of their clinical trial site. The system can output a set of personalized consent documents where conditional clauses, which may be stored as independent and reusable objects, have been evaluated to insert jurisdiction-specific legal disclaimers, information about a specific drug dosage for the participant's study arm, or age-appropriate explanatory text, with each final document being linked to an immutable, document-specific copy of the conditional logic to facilitate a verifiable audit trail.

In another example use case, the system can enable a dynamic content serving system to assemble personalized user interface components for websites or mobile applications. Such a system could receive a request to render a portion of a user interface by processing a layout template and evaluating conditional clauses to dynamically include or exclude interface elements based on user attributes. The system can take, as input, a request to render a portion of a user interface, for example a user's dashboard, where the request metadata includes a profile of the user with attributes such as a subscription level (e.g., a free tier, a premium tier), known content preferences, and a device type (e.g., a desktop computer, a mobile device). The system can output a final data structure. For example, the final data structure can be a structured data format for rendering the user's dashboard, generated by processing a layout template and evaluating conditional clauses to dynamically include or exclude certain feature modules, promotional banners aligned with the user's preferences, or simplified content blocks for mobile devices.

In another example use case, the system can be used in the field of automated legal contract assembly for corporate legal departments or law firms. A system could receive a request to draft a series of similar agreements for multiple different counterparties by customizing a master contract template. The system can receive, as input, a request to draft a series of similar agreements, such as non-disclosure agreements or sales contracts, for multiple counterparties, where the request metadata includes attributes for each counterparty such as their state of incorporation, their business type, and a value of a transaction. The system can output, based on the input, a plurality of customized draft agreements produced by selecting a master contract template and evaluating conditional clauses that insert or modify specific legal clauses, such as those governing jurisdiction and venue, liability caps, or intellectual property rights, based on the attributes of each counterparty.

With reference to the Figures, example embodiments of the present disclosure will be discussed in further detail.

FIG. 1 depicts a block diagram of an example environment 100, including a computing system 110 that performs operations according to example embodiments of the present disclosure. The environment 100 includes a network 102, a computing system 110, one or more computing devices 112, one or more processors 114, one or more memory devices 116, data 118, instructions 120, a remote computing system 130, one or more computing devices 132, one or more processors 134, one or more memory devices 136, data 138, instructions 140, one or more computing devices 152, one or more processors 154, one or more memory devices 156, data 158, and instructions 160.

The network 102 can include any type of communications network. For example, the network 102 can include a local area network (LAN), a wide area network (WAN), an intranet, an extranet, and/or the internet. Further, the network 102 can include any number of wired or wireless connections and/or links that can be used to communicate with one or more computing systems (e.g., the computing system 110 and/or the remote computing system 130) and/or one or more devices (e.g., the one or more computing devices 152). Communication over the network 102 can be performed via any type of wired and/or wireless connection and can use a wide variety of communication protocols (e.g., TCP/IP, Hypertext Transfer Protocol (HTTP), SMTP, FTP), encodings or formats (e.g., HTML, XML), and/or protection schemes (e.g., VPN, secure HTTP, SSL).

The computing system 110 can include any combination of systems and/or devices including one or more computing systems (not shown) and/or one or more computing devices 112. Further, the computing system 110 may be connected (e.g., networked) to one or more computing systems (e.g., remote computing system 130) and/or one or more computing devices (e.g., one or more computing devices 132, one or more computing devices 152, etc.) via the network 102. The computing system 110 may operate in various different configurations, including as a server or a client machine in a client-server network environment, or as a peer machine in a peer-to-peer (or distributed) network environment. Though the computing system 110 is depicted in FIG. 1 as a single device, the computing system 110 can include any collection or combination of devices that, individually or in combination with other devices, execute a set of one or more instructions to perform any one or more of the operations discussed herein.

In this example, the computing system 110 includes one or more computing devices 112. The one or more computing devices 112 can include any type of computing device. For example, the one or more computing devices 112 can include a personal computing device (e.g., a desktop computing device), a mobile computing device (e.g., a smartphone or tablet device), a wearable computing device (e.g., a smartwatch device), an embedded computing device, a web appliance, a server computing device, a network router, a switch, a bridge, or any device capable of executing a set of instructions (e.g., any combination of instructions which can include sequential instructions and/or parallel instructions) associated with one or more operations and/or one or more actions to be performed by the computing system 110 or any of the constituent components and/or devices of the computing system 110.

Any of the one or more computing devices 112 can include the one or more processors 114. The one or more processors 114 can include any processing device (e.g., a processor core, a microprocessor, an application-specific integrated circuit (ASIC), an FPGA, a controller, or a microcontroller) and can include one processor or multiple processors that may be operatively connected. In some embodiments, the one or more processors 114 may include one or more complex instruction set computing (CISC) microprocessors, one or more reduced instruction set computing (RISC) microprocessors, one or more very long instruction word (VLIW) microprocessors, and/or one or more processors that are configured to implement other instruction sets.

The one or more computing devices 112 can include the one or more memory devices 116. The one or more memory devices 116 can be used to store data and/or information and can include one or more computer-readable media, one or more non-transitory computer-readable storage media, and/or one or more machine-readable media. Though the one or more memory devices 116 are depicted in FIG. 1 as a single unit (e.g., a single medium), the computer-readable storage media can include a single medium or multiple media (e.g., a centralized or distributed database, and/or associated caches and servers) that store one or more sets of instructions. Further, the computer-readable storage media can include any medium that is capable of storing, encoding, and/or carrying a set of instructions for execution by a computing device and which may cause the computing device to perform any of the one or more operations described herein. In some embodiments, the computer-readable storage media can include one or more solid-state memories, one or more optical media, and/or one or more magnetic media. By way of example, the one or more memory devices 116 can include any combination of random-access memory (RAM), read-only memory (ROM), EEPROM, EPROM, one or more flash memory devices, and/or one or more magnetic storage devices (e.g., one or more hard disk drives).

The one or more processors 114 can be configured to execute one or more instructions to perform the operations described herein, including, for example, one or more operations associated with responding to bulk document requests, filtering templates, evaluating conditions, accessing objects, generating fixed objects, and transmitting generated documents. Specifically, users can transmit a request for bulk document generation for a plurality of recipients. In some examples, the request can include the list of recipients and attribute data about the users including, but not limited to, the user's location, nationality, role, organization, and any other information needed to generate appropriate documents for the recipient. In some examples, each recipient is associated with a specific organization, and the attribute data may include the location of that organization, which can be distinct from the recipient's personal work location and may be used to satisfy different jurisdictional requirements.

The computing system 110 can enable this request to be generated using various types of applications and/or computer systems. Further, the one or more memory devices 116 can store the data 118 and/or the instructions 120, which can be executed by the one or more processors 114 to cause the one or more computing devices 112 to perform one or more operations.

In one example embodiment, the one or more operations that can be performed by the one or more processors 114 can include but are not limited to, receiving a bulk document request, wherein the request includes a list of recipients and attribute data for those recipients. The operations can comprise identifying a plurality of document templates associated with particular documents. For each recipient, the system can filter the list of templates based on the bulk document requests and the user attribute data. The operations can comprise generating a document from the one or more filtered document templates to generate a final document. The operations can comprise evaluating one or more conditional clauses within the templates.

In another example embodiment, the one or more operations that can be performed by the one or more processors 114 can include any operation discussed below with respect to FIGS. 3-7.

The data 118 can include user data (e.g., data representing attributes associated with a user or a recipient at one or more points in time), organizational data (e.g., attribute data associated with organizations), one or more document data templates (e.g., information used to generate a final document, including optional content), conditional content objects (e.g., information about evaluating conditional content within a template), document content (e.g., the documents generated in response to a bulk document request), permanent object (e.g., an object generated when conditional content is evaluated and made unchangeable so that past documents can be reliably recreated), and/or other types of data.

Further, the instructions 120 can include one or more instructions to use data including the data 118 to perform any one or more of the various operations described herein. In some embodiments, the one or more memory devices 116 can be used to store one or more applications that can be operated by the one or more processors 114. The data 118, the instructions 120, and/or can be associated with generating documents in response to a bulk document request. Further, the computing system 110 may be associated with an organization and may be configured to manage the one or more applications. For example, the computing system 110 can perform one or more operations associated with authenticating one or more users that attempt to access the one or more applications, which can include one or more third-party applications, which may be remote from the computing system 110.

Any of the one or more computing devices 112 can include one or more input devices 122 and/or one or more output devices 124. The one or more input devices 122 can be configured to receive input (e.g., user input) and can include one or more touch screens, one or more keyboards, one or more pointing devices (e.g., mouse device), one or more user interface elements, one or more microphones, and/or one or more cameras. The one or more output devices 124 can include one or more display devices, one or more loudspeaker devices, and one or more haptic output devices. By way of example, the one or more output devices 124 can be used to display a graphical user interface via a display device that can include a touch screen layer that is configured to detect one or more inputs (e.g., one or more user inputs). The one or more processors 114 may perform one or more operations (e.g., operations associated with providing triggers based on one-to-many and/or many-to-one relationships between entities and/or data objects in a system of records) based at least in part on the one or more inputs.

The remote computing system 130 includes the one or more computing devices 132. Each of the one or more computing devices 132 can include one or more processors 134, one or more memory devices 136, the data 138, and/or the instructions 140. The remote computing system 130 can include any of the attributes and/or capabilities of the computing system 110. Further, the remote computing system 130 can communicate with one or more devices and/or one or more systems via the network 102.

In some embodiments, the remote computing system 130 can include one or more applications (e.g., computer software applications comprising computer instructions) that can be stored and/or executed by the remote computing system 130. Further, the one or more applications can include one or more third-party applications that may be accessed from the computing system 110 and which are at least partly operated from the remote computing system 130. The one or more third-party applications generally may be associated with and provided by an organization that is different from the organization that is associated with the computing system 110. Further, the data 138 can include one or more portions of the organizational data (e.g., one or more organizational records), one or more data structures associated with the organizational data, rule data, organizational policy data, application policy data, third-party integration data, application object data, and/or other types of data.

One or more computing devices 152 (e.g., user devices or any other types of devices) can include one or more processors 154, one or more memory devices 156, the data 158, and/or the instructions 160. Such one or more computing devices 152 may include any of the attributes and/or capabilities of the one or more computing devices 112, 132. Further, such one or more computing devices 152 can communicate with one or more devices and/or one or more systems via the network 102.

In some embodiments, the one or more computing devices 152 can include one or more applications (e.g., computer software applications comprising computer instructions) that can be stored and/or executed by such one or more computing devices 152. Further, the one or more applications can include one or more third-party applications that may be accessed from the one or more computing devices 152 and which are at least partly operated from such one or more computing devices 152. Data 158 may include, for example, one or more portions of the organizational data (e.g., one or more organizational records), one or more data structures associated with the organizational data, rule data, organizational policy data, application policy data, third-party integration data (e.g., third-party application integration data), application object data, and/or other types of data.

Figure 2:
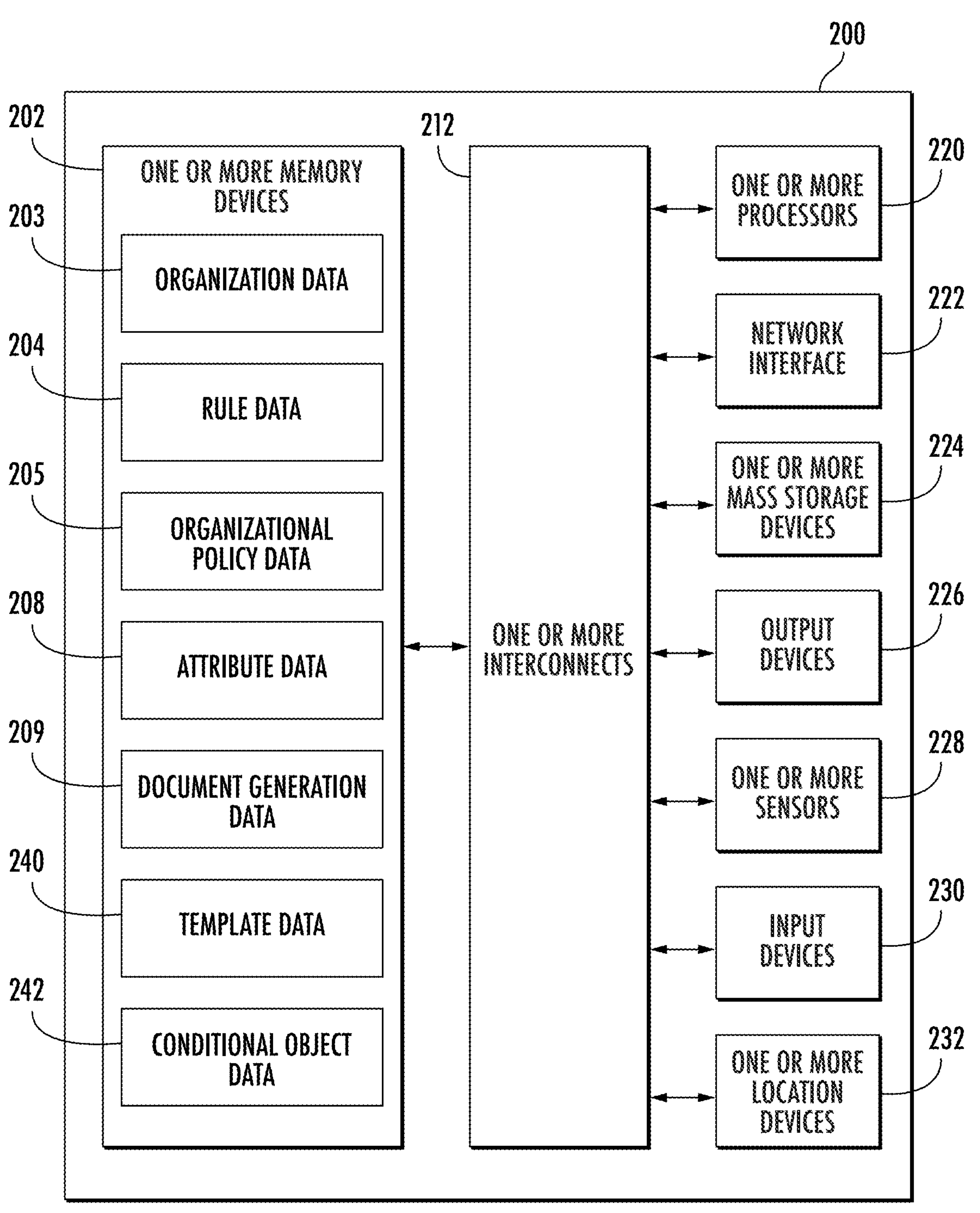
FIG. 2 depicts a block diagram of an example computing device according to example embodiments of the present disclosure.

FIG. 2 depicts a block diagram of an example computing device 200 according to example embodiments of the present disclosure. The computing device 200 can include one or more attributes and/or capabilities of the computing system 110, the remote computing system 130, the one or more computing devices 152, and/or the computing device 200. Furthermore, the computing device 200 can be configured to perform one or more operations and/or one or more actions that can be performed by the computing system 110, the remote computing system 130, the one or more computing devices 152, and/or the computing device 200.

As shown in FIG. 2, the computing device 200 can include one or more memory devices 202, organizational data 203, rule data 204, organizational policy data 205, attribute data 208, document generation data 209, template data 240, conditional object data 242, one or more interconnects 212, one or more processors 220, a network interface 222, one or more mass storage devices 224, one or more output devices 226, one or more sensors 228, one or more input devices 230, and/or one or more location devices 232.

The one or more memory devices 202 can store information and/or data (e.g., organizational data 203, rule data 204, organizational policy data 205, attribute data 208, document generation data 209, template data 240, conditional object data 242, and/or any other types of data). Further, the one or more memory devices 202 can include one or more non-transitory computer-readable storage media, including RAM, ROM, EEPROM, EPROM, flash memory devices, magnetic disks, and any combination thereof.

In one example embodiment, the information and/or data that can be stored by the one or more memory devices 202 can be executed by the one or more processors 220 to cause the computing device 200 to perform one or more operations associated with receiving a user input query via one or more interfaces (e.g., as described below with respect to FIG. 4).

In another example embodiment, the information and/or data that can be stored by the one or more memory devices 202 can be executed by the one or more processors 220 to cause the computing device 200 to perform one or more operations associated with generating a response to a user input query about user data values (e.g., as described below with respect to FIGS. 3-7).

The organizational data 203 can include one or more portions of data (e.g., the data 118, the data 138, and/or the data 158, which are depicted in FIG. 1) and/or instructions (e.g., the instructions 120, the instructions 140, and/or the instructions 160, which are shown in FIG. 1) that are stored respectively in any of the one or more memory devices 116, 136, 156. The organizational data 203 can also include information associated with one or more applications (e.g., one or more third-party applications), one or more organizational records, and/or one or more organizational policies. In some embodiments, the organizational data 203 can be received from one or more computing systems (e.g., the remote computing system 130 depicted in FIG. 1), which can include one or more computing systems that are remote (e.g., in another room, building, part of town, city, or nation) from the computing device 200.

The rule data 204 can include one or more portions of data (e.g., the data 118, the data 138, and/or the data 158, which are depicted in FIG. 1) and/or instructions (e.g., the instructions 120, the instructions 140, and/or the instructions 160, which are depicted in FIG. 1) that are stored in the one or more memory devices 116, the one or more memory devices 136, and/or the one or more memory devices 156, respectively. The rule data 204 can include information associated with receiving bulk document requests, accessing a plurality of document templates, filtering the document templates, evaluating one or more conditional clauses, and generating a plurality of documents. In some embodiments, the rule data 204 can be received from one or more computing systems (e.g., the remote computing system 130 depicted in FIG. 1), which can include one or more computing systems that are remote from the computing device 200.

The organizational policy data 205 can include one or more portions of data (e.g., the data 118, the data 138, and/or the data 158, which are depicted in FIG. 1) and/or instructions (e.g., the instructions 120, the instructions 140, and/or the instructions 160, which are depicted in FIG. 1) that are stored in the one or more memory devices 116, the one or more memory devices 136, and/or the one or more memory devices 156, respectively. Furthermore, the organizational policy data 205 can include information associated with one or more organizational policies that are used to regulate the generation of documents. For example, certain users may be authorized to request document generation. In some embodiments, the organizational policy data 205 can be received from one or more computing systems (e.g., the remote computing system 130 depicted in FIG. 1), which can include one or more computing systems that are remote from the computing device 200.

The attribute data 208 can include information about a plurality of users, organizations, locations, and so on. For example, attribute data 208 for a particular user can include the user's location, role, organization, salary, demographic information, and so on. The attributes of the user can be used to determine which document templates should be used to generate documents for the users and how to evaluate conditional clauses associated with those document templates.

In some examples, the attribute data 208 for a particular organization can include one or more locations associated with the organization, the organization's tax status, the policies of the organization, the structure of the organization, and so on. In other examples, information about an organization's attributes can include, but is not limited to, individuals associated with the organization (e.g., employees, vendors, independent contractors, etc.), departments, teams, roles, groups, locations, offices, documents, tasks, reports, accounts, devices, applications, end-user applications, licenses, workflows, alerts, organizational policy data 205, and/or any other type of entity representing or related to managing the organization (e.g., organizational data 203).

In some examples, the attribute data 208 for a particular location can include local rules and regulations. For example, different countries, cities, counties, provinces, etc., may have different rules and regulations that can be used to determine which documents are needed for particular situations. In some examples, the attribute data for a particular location can be used to generate document templates and then selecting those document templates in response to a bulk document request.

The document generation data 209 can be any data used in the process of creating a document. For example, the document generation data 209 can include instructions describing how to access a particular document template, how to evaluate whether the document template is appropriate for a particular user, how to evaluate any conditional clauses associated with the document template, and how to generate a final document based on the content of the template and the evaluation of any conditional clauses.

The one or more memory devices 202 can further store template data 240. The template data 240 can include a plurality of predefined document layouts or formats. Each predefined document can include a plurality of associated attributes. For example, a particular document template can be associated with users from a particular country. The document generation system can use the attribute data to filter document templates to select document templates that match the attributes of a particular recipient of the bulk document request. In some examples, a particular document template can include one or more conditional clauses. Each conditional clause can include one or more rules (e.g., attributes that must be true for the conditional to be evaluated as true) and conditional content that is either included or not included depending on the evaluation of the rules. In some examples, the document template includes a reference to a conditional object stored in the conditional object data 242 rather than including that content in the template itself.

The one or more memory devices 202 can also store conditional object data 242. The conditional object data 242 can include data elements or content that are included in a document based on the evaluation of a particular condition. For example, a particular document template can include a first set of information or terminology for a recipient in a first country and a second set of information or terminology for a recipient in a second country. The conditional object data 242 can include the condition and can include the text to be included based on the evaluation. Document templates can include a reference to a particular conditional object. When the final documents are generated, the system can access any reference conditional objects, evaluate the condition, and include or exclude the associated content based on the evaluation of the condition.

The one or more interconnects 212 can include one or more interconnects or buses that can be used to send and/or receive one or more signals (e.g., electronic signals) and/or data (e.g., organizational data 203, rule data 204, organizational policy data 205, attribute data 208, document generation data 209, template data 240, conditional object data 242, and/or any other data) between components of the computing device 200, including the one or more memory devices 202, the one or more processors 220, the network interface 222, the one or more mass storage devices 224, the one or more output devices 226, the one or more sensors 228 (e.g., a sensor array), the one or more input devices 230, and/or the one or more location devices 232. The one or more interconnects 212 can be arranged or configured in different ways. For example, the one or more interconnects 212 can be configured as parallel or serial connections. Further, the one or more interconnects 212 can include one or more internal buses that are used to connect the internal components of the computing device 200 and one or more external buses used to connect the internal components of the computing device 200 to one or more external devices. By way of example, the one or more interconnects 212 can include different interfaces including Industry Standard Architecture (ISA), Extended ISA, Peripheral Components Interconnect (PCI), PCI Express, Serial AT Attachment (SATA), HyperTransport (HT), Universal Serial Bus (USB), Thunderbolt, IEEE 1394 interface (FireWire), and/or other interfaces that can be used to connect components.

The one or more processors 220 can include one or more computer processors that are configured to execute the one or more instructions stored in the one or more memory devices 202. For example, the one or more processors 220 can, for example, include one or more general purpose CPUs, ASICs, and/or one or more graphics processing units (GPUs). Further, the one or more processors 220 can perform one or more actions and/or operations, including one or more actions and/or operations associated with organizational data 203, rule data 204, organizational policy data 205, attribute data 208, document generation data 209, template data 240, conditional object data 242, and/or any other data. The one or more processors 220 can include single or multiple core devices, including a microprocessor, microcontroller, integrated circuit, and/or a logic device.

The network interface 222 can support network communications. The network interface 222 can support communication via networks, including a local area network and/or a wide area network (e.g., the internet). For example, the network interface 222 can allow the computing device 200 to communicate with the computing system 110 via the network 102.

The one or more mass storage devices 224 (e.g., a hard disk drive and/or a solid-state drive) can be used to store data, including the organizational data 203, rule data 204, organizational policy data 205, attribute data 208, document generation data 209, template data 240, conditional object data 242, and/or any other data. The one or more output devices 226 can include one or more display devices (e.g., liquid crystal display (LCD), OLED display, mini-LED display, micro-LED display, plasma display, and/or cathode ray tube (CRT) display), one or more light sources (e.g., LEDs), one or more loudspeakers, and/or one or more haptic output devices (e.g., one or more devices that are configured to generate vibratory output).

The one or more sensors 228 can be configured to detect various states and can include one or more cameras, one or more light detection and ranging (LiDAR) devices, one or more sonar devices, and/or one or more radar devices. Further, the one or more sensors 228 can be used to provide input (e.g., an image of a user captured using the one or more cameras) that can be used as part of invoking or performing one or more operations. For example, the one or more sensors 228 can be used to authenticate the identity of a user and determine an authorization level based on an image of the user's face that is captured using the one or more sensors 228.

The one or more input devices 230 can include one or more touch sensitive devices (e.g., a touch screen display), a mouse, a stylus, one or more keyboards, one or more user interface elements (e.g., ON/OFF user interface elements and/or YES/NO user interface elements), one or more microphones, and/or one or more cameras (e.g., cameras that are used to detect gestures that can trigger one or more operations by the computing device 200).

Although the one or more memory devices 202 and the one or more mass storage devices 224 are depicted separately in FIG. 2, the one or more memory devices 202 and the one or more mass storage devices 224 can be regions within the same memory module. The computing device 200 can include one or more additional processors, memory devices, and/or network interfaces, which may be provided separately or on the same chip or board. The one or more memory devices 202 and the one or more mass storage devices 224 can include one or more computer-readable media, including, but not limited to, non-transitory computer-readable media, RAM, ROM, hard drives, flash drives, and/or other memory devices.

The one or more memory devices 202 can store sets of instructions for applications, including an operating system that can be associated with various software applications or data. For example, the one or more memory devices 202 can store sets of instructions for one or more applications (e.g., one or more organizational applications and/or one or more third-party applications) that are subject to one or more application policies or utilize third-party integration data that can be configured, generated, and/or implemented by the computing device 200 and/or one or more other computing devices or one or more computing systems. In some embodiments, one or more memory devices 202 can be used to operate or execute a general-purpose operating system that operates on mobile computing devices and/or stationary devices, including, for example, smartphones, laptop computing devices, tablet computing devices, and/or desktop computers.

The software applications that can be operated or executed by the computing device 200 can include applications associated with the computing system 110, the remote computing system 130, and/or the one or more computing devices 152 that are depicted in FIG. 1. Further, the software applications that can be operated and/or executed by the computing device 200 can include native applications, web services, and/or web-based applications.

The one or more location devices 232 can include one or more devices or circuitry for determining the position of the computing device 200. For example, the one or more location devices 232 can determine an actual and/or relative position of the computing device 200 by using a satellite navigation positioning system (e.g., a GPS system, a Galileo positioning system, the GLObal Navigation satellite system (GLONASS), the BeiDou Satellite Navigation and Positioning system, an inertial navigation system, a dead reckoning system, based on IP address, by using triangulation and/or proximity to cellular towers or Wi-Fi hotspots, and/or beacons.

Figure 3:
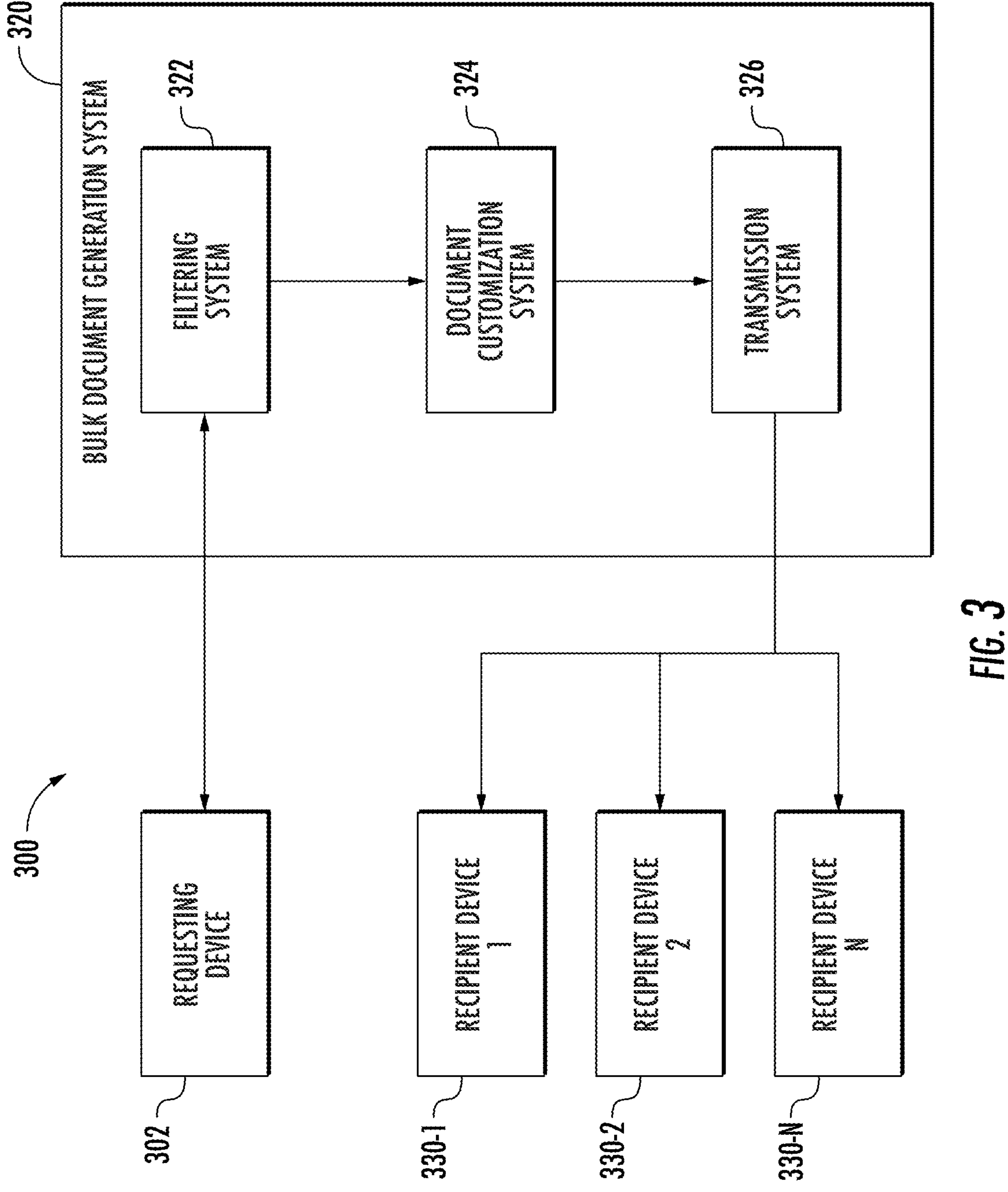
FIG. 3 illustrates an example implementation of the system architecture for a document generation system according to example embodiments of the present disclosure.

FIG. 3 illustrates an example implementation of the system architecture for a document generation system 300 according to example embodiments of the present disclosure. The architecture can include a requesting device 302, a bulk document generation system 320, and a plurality of recipient devices, such as recipient device 1 330-1, recipient device 2 330-2, and recipient device N 330-N. The bulk document generation system 320 can be communicatively coupled with the requesting device 302 and the recipient devices 330-1, 330-2, 330-N. The bulk document generation system 320 can further include a filtering system 322, a document customization system 324, and a transmission system 326.

A requesting device 302 can be any suitable computing device. For example, the requesting device 302 can be a personal computer, a laptop computer, a tablet, or a smartphone. The requesting device 302 can include one or more processors and memory, and can be configured to communicate with the bulk document generation system 320, for example, over a network. The requesting device 302 can generate a bulk document request. The bulk document request can include a list of recipients and a list of document types. In some examples, the list of document types can be determined based on an event (e.g., a round of employment offers). In some examples, the bulk document request can be generated based on user input. In other examples, the bulk document request can be generated automatically based on one or more conditions being met. For example, the bulk document request can be generated automatically when a certain event is entered into an application on the requesting device 302.

The requesting device can transmit the bulk document request to the bulk document generation system 320. A bulk document generation system 320 can include one or more computing devices, such as servers or cloud-based computing resources. The bulk document generation system 320 can be configured to receive information from the requesting device 302. The bulk document generation system 320 can include a filtering system 322, a document customization system 324, and a transmission system 326.

The filtering system 322 can include hardware, software, or a combination thereof. For example, the filtering system 322 can be a software module executed by one or more processors of the bulk document generation system 320. The filtering system 322 can be configured to process the bulk document request, which may be received from the requesting device 302. The bulk document request can include a list of recipients, a list of documents or document types, and attribute information for the recipients.

For each recipient in the list of recipients, the filtering system 322 can access attribute data associated with the recipient. As discussed above, the attribute data can include the user's location, nationality, role, an action associated with the recipient, and any other information relevant to the bulk document request. The filtering system 322 can, for each document type associated with a particular recipient, filter the plurality of document templates and identify at least one template of each document type based on the attributes of the recipient. Thus, if the recipient is from a particular country and the bulk document request indicates that the recipient is to receive a nondisclosure agreement, the filtering system 322 can filter the non-disclosure agreement templates to identify one that is associated with a particular country that the user is located in. The filtering system 322 can repeat this process for each recipient in the list of recipients and for each document type associated with each recipient. As a result, the filtering system 322 can output, for each recipient, a list of document templates matched to their particular attributes and the list of document types associated with the recipient. Thus, if a particular recipient has three document types associated with them in the bulk document request, the output of the filtering system 322 can be 3 templates that are selected to match the user's attributes.

In some examples, the filtering system 322 can interact with the document customization system 324 to further refine the filtering process. For example, the document templates can include clauses, variables, and fields that have associated metadata. The metadata describes information that can be represented by the variables, included in the fields, etc. Thus, the filtering system 322 further filters the templates based on the restrictions associated with the contents of a particular template. If a particular variable or field is restricted to particular counties, roles, organizations, document types, or domains, the system can use that information to further refine the list of applicable templates for a particular user or event.

The filtering system 322 can pass the list of document templates for each user to the document customization system 324. The document customization system 324 can be a component configured to generate documents. For example, the document customization system 324 can be a software application or service. The document customization system 324 can be configured to receive, for each recipient in the list of recipients, a list of document templates. The document customization system 324 can use the document templates to generate a document. In this way, the document generation system 324 can generate a distinct document for each template in the list of document templates.

In some examples, the document customization system 324 can evaluate a plurality of conditional clauses in each of the templates. The conditional clause can be a portion of the document that is only included if a particular condition is met. For example, conditional clauses can be based on the country of a particular user is in, the role they are accepting, or any other attribute of the user or the organization. Thus, the document customization system 324 can evaluate each condition in the conditional clause and determine whether to include the conditional content or not. In some examples, the conditional clause can include two portions of conditional content, one for if the condition is met, and one for if the condition is not met.

In some examples, the template includes a link to a conditional content object. Thus, the document customization system 324 can access the conditional content object from wherever it is stored. The document customization system 324 can then evaluate the condition associated with the object, and, if the condition is met, include the conditional content. In some examples, this process includes making it a permanent version of the conditional content that can be referred back to later even if the conditional object to which it refers changes. In this way, documents can be faithfully recreated or accessed based on the information at the time it was generated, even if elements of the template or the conditional clause change later.

The document customization system 324 can provide the fully generated documents to the transmission system 326. The transmission system 326 can include one or more communication interfaces. For example, the transmission system 326 can be a network interface controller or a software module configured to manage outgoing communications. The transmission system 326 can be configured to receive documents from the document customization system 324 and to transmit them to other or more recipient devices (e.g., 330-1, 330-2, . . . 330-N).

In some examples, the transmission system 326 can determine, from the bulk document request, transmission address for each recipient. The transmission system 326 can use the addresses to transmit the relevant documents to each recipient. Each recipient can be associated with a recipient device.

Recipient device 1 330-1, recipient device 2 330-2, and recipient device N 330-N can be any suitable computing devices capable of receiving electronic communications. For example, recipient device 1 330-1, recipient device 2 330-2, and recipient device N 330-N can be personal computers, email clients, or mobile devices. Each of recipient device 1 330-1, recipient device 2 330-2, and recipient device N 330-N can be configured to communicate with the transmission system 326 of the bulk document generation system 320. The recipients can use the recipient devices to access the bulk documents, view the bulk documents, provide responses to the documents, and so on.

Figure 4:
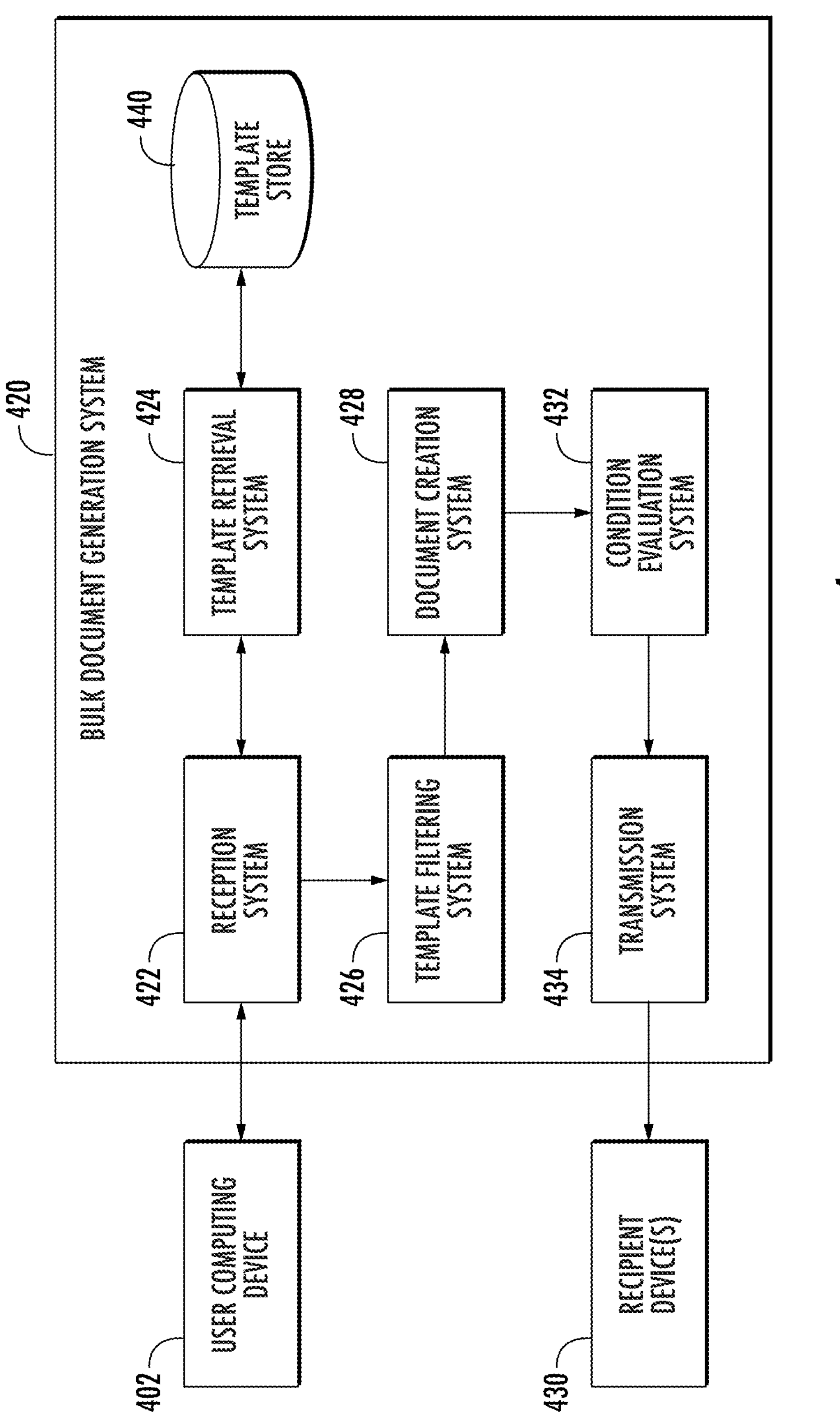
FIG. 4 illustrates an example implementation of a bulk document generation system 420 according to example embodiments of the present disclosure.

FIG. 4 illustrates an example implementation of a bulk document generation system 420 according to example embodiments of the present disclosure. The bulk document generation system 420 can be in communication with a user computing device 402 and one or more recipient device(s) 430.

A user computing device 402 can be any suitable computing device, for example, a desktop computer, a laptop, a tablet, or a smartphone, configured to interact with the bulk document generation system 420. The recipient device(s) 430 can be one or more computing devices capable of receiving electronic documents, such as a personal computer or a mobile device. The bulk document generation system 420 can be implemented on one or more computing devices, such as servers or a distributed computing environment, and can include a plurality of interconnected subsystems.

The bulk document generation system 420 can include a reception system 422, a template retrieval system 424, a template filtering system 426, a document creation system 428, a condition evaluation system 432, and a transmission system 434. The bulk document generation system 420 may also be communicatively coupled with a template store 440.

The reception system 422 can be configured to receive data from the user computing device 402. For example, the reception system 422 can be an application programming interface (API) endpoint or a web server interface. The user computing device 402 can, in response to direct user input (or automatically at a particular step of a process), transmit a bulk document request to the bulk document generation system 420. A bulk document request is a request to generate a plurality of documents for a plurality of recipients. In some examples, the bulk document requests can be generated in response to a particular action performed at the user computing device 402 or a particular event. For example, a user at the user computing device can select a list of documents to be generated and a list of recipients for whom they are to be generated. In response, the user computing device 402 can transmit the bulk document request to the bulk document generation system 420. In other examples, the bulk document request can be part of a workflow for an application at the user computing device 402. For example, if the user of the user community device 402 is involved in human relations processes, part of those processes may include automatic generation of a bulk document request.

A bulk document request can include a list of recipients and a list of document types. As noted above, the list of recipients can be selected by a user or can be automatically generated based on another event. Similarly, the list of document types can be selected by a user or can be determined based on a particular event. For example, if an organization is hiring a group of people, part of the hiring flow may include generating a bulk document request that includes a list of people to be hired and the standard documents needed as part of the hiring process.

The reception system 422 can receive the bulk document request and transmit it to the template retrieval system 424. The template retrieval system can access a template store 440 and retrieve a plurality of document templates. The plurality of document templates retrieved can be determined based on one or more document types included in the bulk document request.

The template store 440 can be any data storage system, for example, a database, a file system, or a cloud storage service, and can store one or more document templates. The template store 440 can store a plurality of document templates. Each document template can have one or more associated attributes. Each associated attribute can enable the system to determine which transactions or users the template is appropriate for. For example, different countries or organizations can have different requirements for their documents. As such, the different countries or organizations may have different templates.

In addition, particular templates can include conditional clauses that have content that will only be included in the document when a particular clause is satisfied. For example, a given template may include different particular data depending on the role of the recipients, their location, or the company policies. Thus, templates can be filtered based on the associated attributes or can be customized based on conditional content. Once the template retrieval system 424 has retrieved a plurality of document templates from the document template store 440, the plurality of templates can be returned to the reception system 422 or transmitted directly to the template filtering system 426.

The template filtering system 426 can be configured to receive a plurality of document templates, for example, from the template retrieval system 424 via the reception system 422, and to receive data, for example, from the reception system 422. The template filtering system 426 can apply one or more criteria or rules to select a subset of the received templates. For example, the template filtering system can determine, for each recipient in the list of recipients included in the bulk document request, one or more attributes and one or more document types. The template filtering system 426 can then determine one or more document templates that match both the attribute of the recipient and the document type associated with the recipient. For example, if a particular recipient is from country A and has three associated document types, the template filtering system 426 can filter the list of document templates to identify three document templates that match the three document types. Furthermore, the template filtering system 426 can filter the document templates to select the document templates associated with country A. This process can be repeated for each recipient and for each document type associated with that recipient. As a result, the template filtering system 426 will generate a list of document templates associated with each recipient.

In some examples, the template filtering system 426 can interact with the document creation system 428 to refine the list of document templates. For example, each document template can include clauses, fields, and variables that are restricted to particular locations, roles, events, organizations, and so on. If so, that information can be used template filtering system 426 to further refine the list of applicable document templates. In this way, the template filtering system 426 and the document creation system 428 can work together to identify the correct template for a particular situation.

The document creation system 428 can receive one or more filtered templates from the template filtering system 426 and associated data. The document creation system 428 can use a document template to generate a final document. The document template includes the content included in a particular document as well as any conditional clauses that may be included in the document depending on one or more attributes of the recipient, with the organization, and other factors. As noted above, a conditional clause may be a reference to a conditional clause object that is not included in the template but can be referenced by the template. The document creation system 428 can generate a final document including any information in the template.

The document creation system 428 can access the condition evaluation system 432 to evaluate any conditional clauses included in the template. For example, the condition evaluation system 432 can access each conditional clause for a particular document template, determine whether the conditional clause is satisfied based on information associated with the user or other information included in the bulk document request, and, if the condition is satisfied, include the conditional content in the final document.

In some examples, generating a final version of a document from a document template can also include generating a static object representing the conditional content that is immutable once the document is created. For example, if the template includes a reference to a conditional clause object, that conditional clause object may be altered in the future. However, to ensure that the document can reliably be retrieved (or recreated) in the future, the document creation system 428 or the condition evaluation system 432 can create an immutable object representing the condition at the time the document was created and the attributes used to evaluate the condition. In this way, the document can be reliably recreated in the future if needed.

Once the final versions of the documents have been generated, the condition evaluation system 432 or the document creation system 428 can transmit the final version of the documents to the transmission system 434. The transmission system 434 can be configured to transmit the one or more documents to the one or more recipient device(s) 430. For example, the transmission system 434 can be an email server, a messaging service, or an API client configured to send data to an external system. In some examples, the information needed to transmit the documents to the recipient devices (e.g., e-mail addresses, IP addresses, or other information) can be included in the bulk document request.

Figure 5:
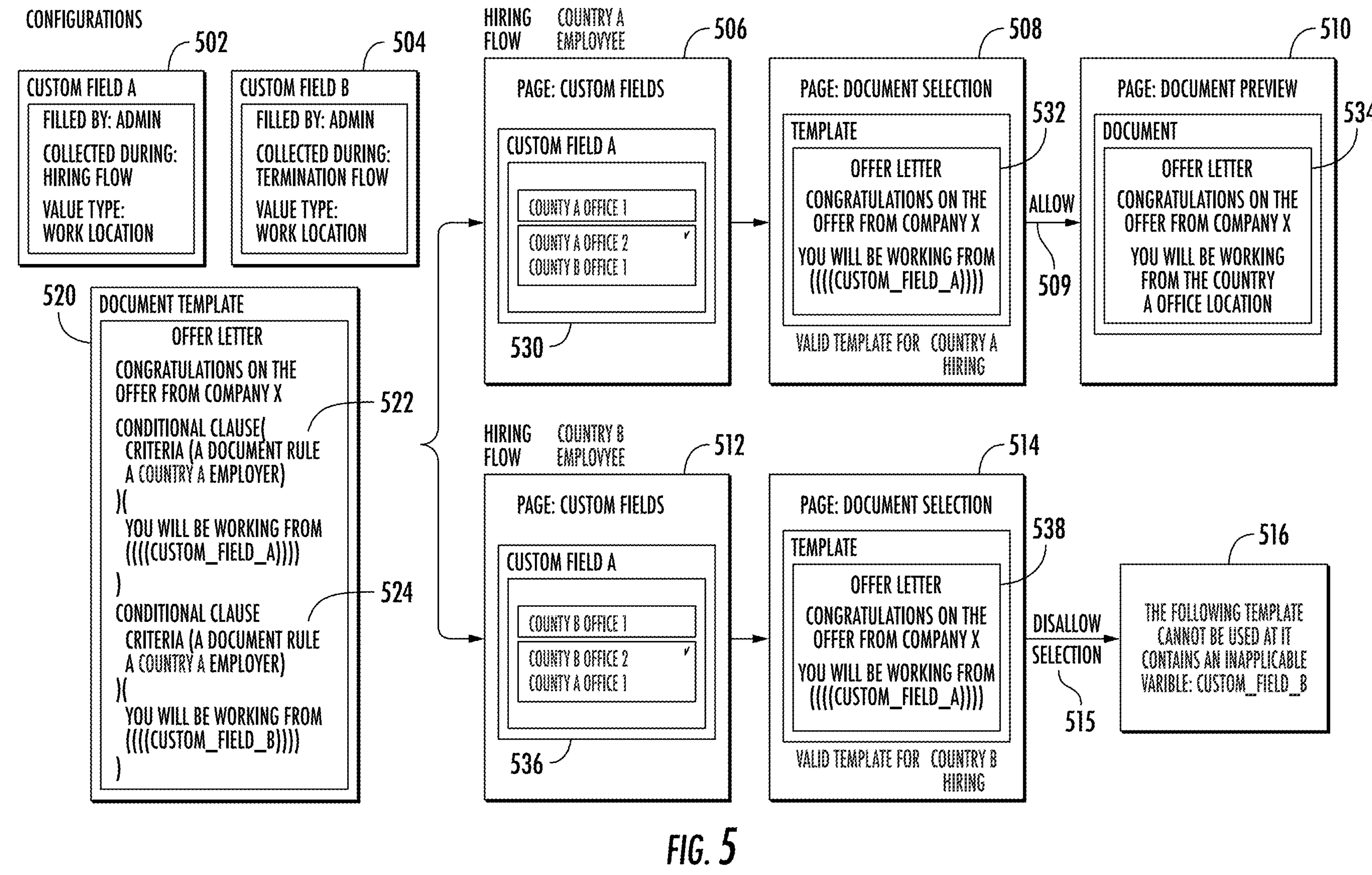
FIG. 5 illustrates an example implementation of workflows for document generation according to example embodiments of the present disclosure.

FIG. 5 illustrates an example implementation of workflows for document generation according to example embodiments of the present disclosure. In some examples, the workflow can initially include one or more custom fields. Custom fields can include information provided by a user (e.g., an administrator) during the process of document generation. In this example, the custom fields include Custom Field A 502 and Custom Field B 504. Each custom field includes the user who provides the value for the custom field, the particular workflow in which the custom field is collected, and the value type associated with the custom field. In this example, custom field A 502 can be defined to be filled by an administrator, collected during a hiring workflow, and have a value type of work location. Custom field B 504 can be defined as being filled by an administrator, collected during a termination workflow, and have a value type of work location.

This implementation includes two example workflows, a first workflow associated with employees from country A and a second workflow associated with employees from country B. The first workflow may access a document template 520 and proceed through several stages. The stages include the custom field collection stage 506, a document selection stage 508, and document preview stage 510.

In one specific example, when a user is determined to be associated with country A, the first workflow begins. The document template 520 includes a first conditional clause 522, with a criteria based on whether the user is an employee in country A. The document template 520 includes a second conditional clause 524 with a criteria based on whether the user is an employee in country B. First, the document template 520 indicates that the information associated with custom field A 502 is needed. The administrator uses the data input object 530 to indicate that the user is starting at an office location in country A. The conditional clause 532 evaluates that the user is to be hired in country A and, at 509, allows generation of final document 534. The document preview stage 510 displayed a preview of the final document 534.

In another example, the user is determined to be associated with country B, and the second example workflow begins. The first stage 512 includes determining that the document template 520 indicates the information associated with custom field A 502 is needed. The administrator uses the data input object 536 to indicate that user is starting at an office location in country B. At the second stage 514, the system evaluates the conditional clause 538 to determine that the user is to be hired in country B and, at 515, disallows generation of the document based on the document template 520. There is no document preview stage, and instead, the system, at 516, indicates that the template cannot be used. The system can determine that the template cannot be used based on an outcome of determining that Node 504 is inapplicable to the request context (e.g., a termination related field cannot be used in a hiring flow).

Figure 6:
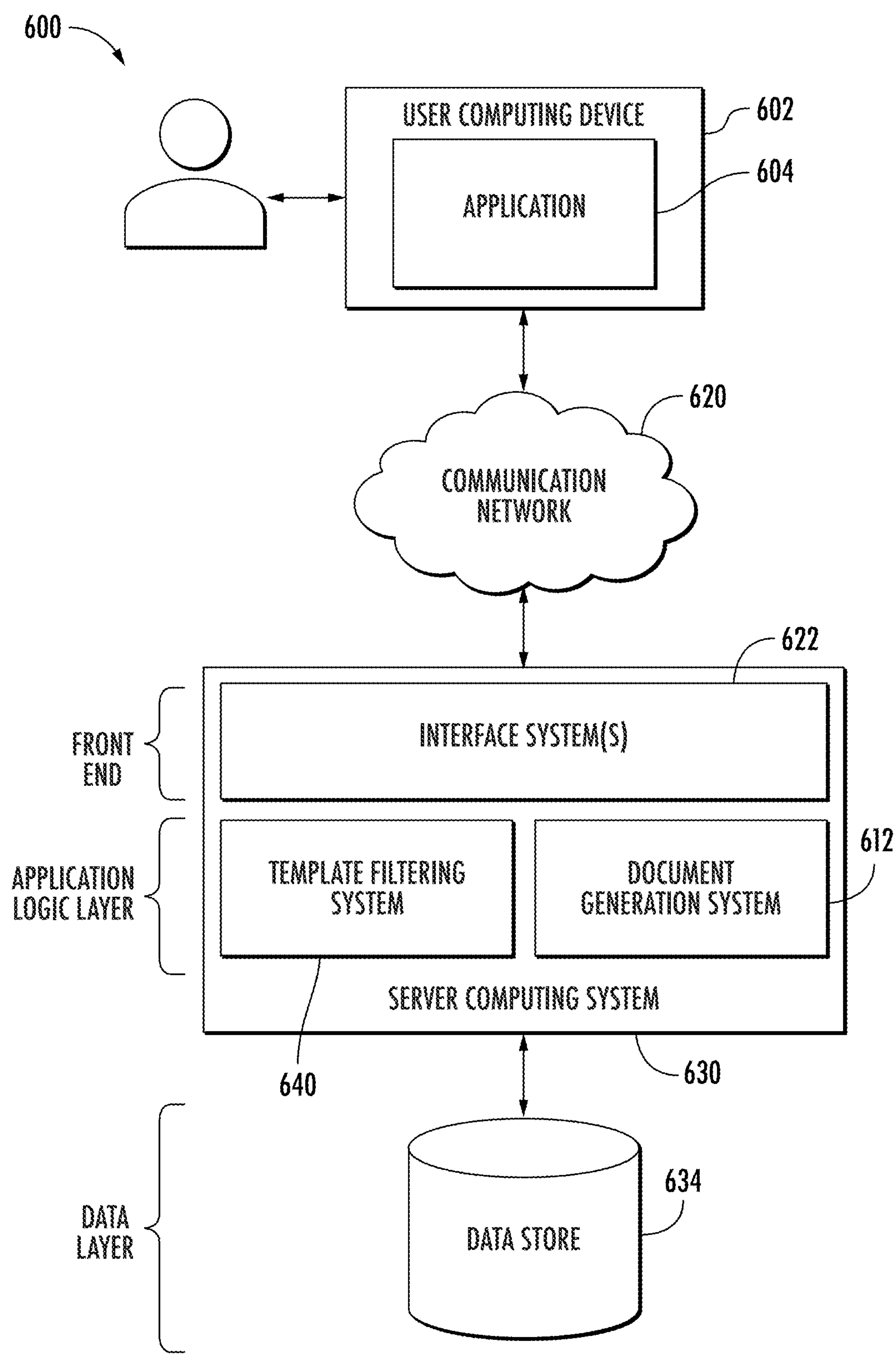
FIG. 6 depicts an example client-server environment according to example embodiments of the present disclosure.

FIG. 6 depicts an example client-server environment 600 according to example embodiments of the present disclosure. The client-server system environment 600 includes one or more user computing devices 602 and a server computing system 630. One or more communication networks 620 can interconnect these components. The one or more communication networks 620 may be any of a variety of network types, including local area networks (LANs), WANs, wireless networks, wired networks, the Internet, personal area networks (PANs), or a combination of such networks.

A user computing device 602 can include, but is not limited to, smartphones, smartwatches, fitness bands, navigation devices, laptop computers, desktop computers, tablet computers, and embedded computing devices (computing devices integrated into other objects, such as clothing, vehicles, or other objects). In some examples, a user computing device 602 can include one or more sensors intended to gather information with the permission of the user associated with the user computing device 602.

In some examples, the user computing device 602 can include one or more application(s) 604 such as data access applications, search applications, communication applications, navigation applications, productivity applications, game applications, word processing applications, or any other applications. The application(s) can include a web browser. The user computing device 602 can use a web browser (or other application) to send and receive requests to and from the server computing system 630. The application(s) can include a specific application for communicating with the server computing system 630. To do so, the application can receive input from a user. The input can be requested for a bulk document generation. The application can transmit the user input to the server computing system 630. The server computing system 630 can analyze the input and, if the input includes a user query, generate a response. The response can be transmitted to the user computing device 602 for display to the user.

As shown in FIG. 6, the server computing system 630 can generally be based on a three-tiered architecture, comprising a front-end layer, an application logic layer, and a data layer. As is understood by skilled artisans in the relevant computer and Internet-related arts, each component shown in FIG. 6 can represent a set of executable software instructions and the corresponding hardware (e.g., memory and processor) for executing the instructions. To avoid unnecessary detail, various components and engines that are not germane to conveying an understanding of the various examples have been omitted from FIG. 6. However, a skilled artisan will readily recognize that various additional components, systems, and applications may be used with a server computing system 630, such as that illustrated in FIG. 6, to facilitate additional functionality that is not specifically described herein. Furthermore, the various components depicted in FIG. 6 may reside on a single server computer or may be distributed across several server computers in various arrangements. Moreover, although the server computing system 630 is depicted in FIG. 6 as having a three-tiered architecture, the various example embodiments are by no means limited to this architecture.

As shown in FIG. 6, the front end can consist of an interface system(s) 622, which receives communications from one or more user computing devices 602 and communicates appropriate responses to the user computing devices 602. For example, the interface system(s) 622 may receive requests in the form of HTTP requests, or other web-based API requests. The user computing devices 602 may be executing conventional web browser applications or applications that have been developed for a specific platform to include any of a wide variety of computing devices and operating systems.

As shown in FIG. 6, the data layer can include a data store 634. The data stored in the data store 634 can be a variety of document templates, attribute data, conditional clauses, conditional clause objects, and so on. The document templates can include data for generating documents. Each document template can have a document type (e.g., the type of document generated by the template), attribute information (e.g., describing the locations, roles, events, organizations, for whom the template is appropriate), conditional clauses (e.g., rules for determining whether conditional content is included in a document generated from the template), references to conditional clause objects (e.g., information describing where to access the objects that describe certain conditional clauses), information about formatting, and any other information needed to generate a final document.

The attribute data can include attributes for organizations, recipients, countries, and so on. The attributes can be locations, roles, policies, nationality, organization, event type, information about the user's history with their organization. Attributes for organizations can include policies and rules. The attribute data can also include field data generated by an administrator about a particular document request or event.

The application logic layer can include application data that can provide a broad range of other applications and services that allow users to perform transactions or other purposes. The application logic layer can include a template filtering system 640 and a document generation system 612.

The interface system 622 can receive a bulk document request. A bulk document request can include a list of recipients, a list of document types, and data about the information to be included in one or more documents. The template filtering system 640 can retrieve a plurality of document templates from the data store 634. The plurality of document templates retrieved can be determined based on one or more document types included in the bulk document request.

The template filtering system 640 can apply one or more criteria or rules to select a subset of the received templates. For example, the template filtering system 640 can determine, for each recipient in the list of recipients included in the bulk document request, one or more attributes and one or more document types. The template filtering system 640 can determine one or more document templates that match both the attribute of the recipient and the document type associated with the recipient. This process can be repeated for each recipient and for each document type associated with that recipient. As a result, the template filtering system 640 will generate a list of document templates associated with each recipient.

The document generation system 612 can receive one or more templates from the template filtering system 640. The document generation system 612 can use a document template to generate a final document. The document template includes the content included in a particular document as well as any conditional clauses that may be included in the document depending on one or more attributes of the recipient, with the organization, and other factors. The document generation system 612 can evaluate any conditional clauses included in the template. For example, the document generation system 612 can access each conditional clause for a particular document template, determine whether the conditional clause is satisfied based on information associated with the user or other information included in the bulk document request, and, if the condition is satisfied, include the conditional content in the final document.

Once the final versions of the documents have been generated, the document generation system 612 can transmit the final document to one or more recipients via the interface system. In some examples, the information needed to transmit the documents to the recipient devices (e.g., e-mail addresses, IP addresses, or other information) can be included in the bulk document request.

Figure 7:
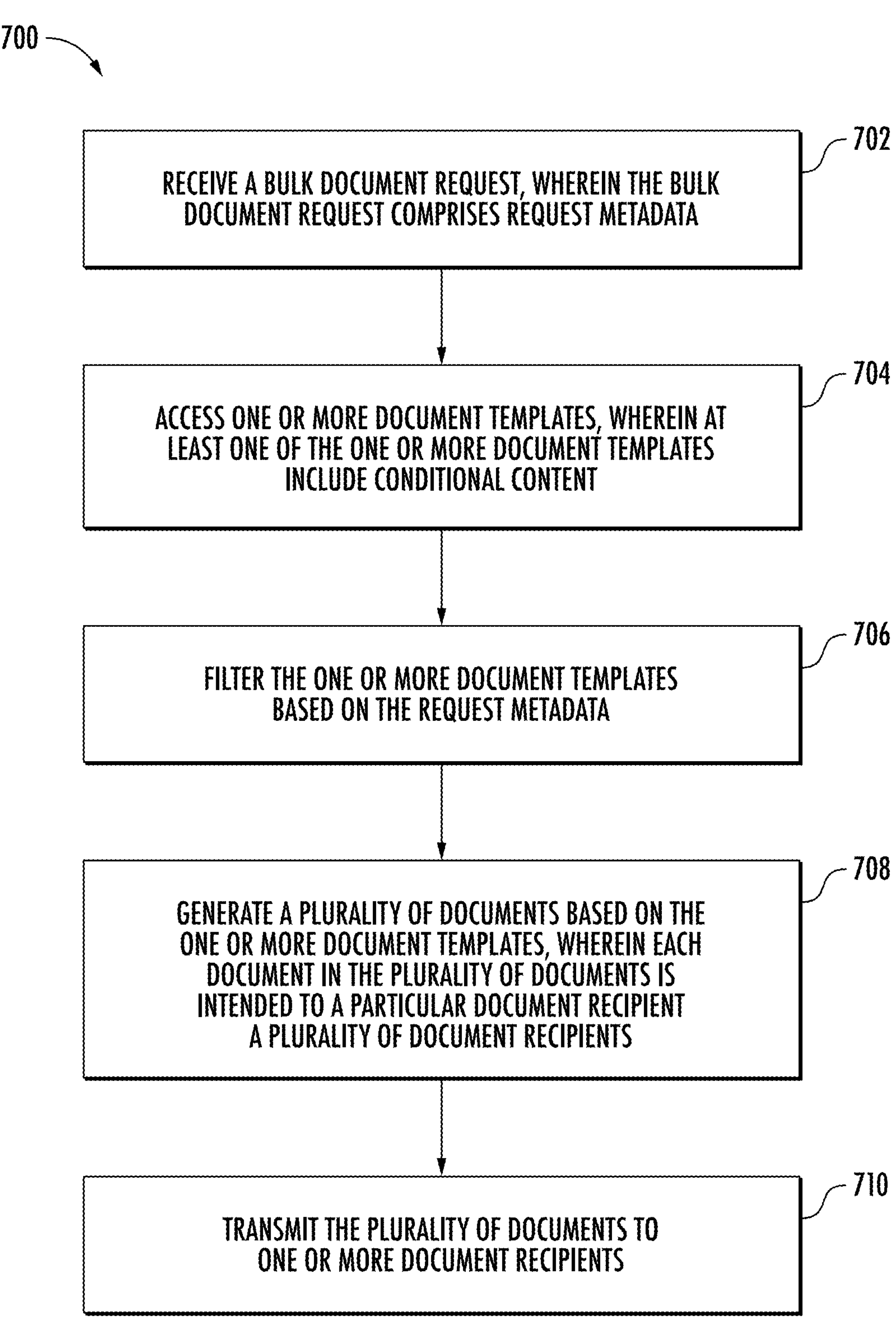
FIG. 7 depicts a flowchart diagram of an example method to generate documents in response to bulk document requests in accordance with some embodiments of the present disclosure.

FIG. 7 depicts a flowchart diagram of an example method 700 to generate documents in response to bulk document requests in accordance with some embodiments of the present disclosure. Method 700 can be performed by processing logic that can include hardware (e.g., computing devices, processing devices, circuitry, programmable logic, dedicated logic, hardware of a device, microcode, integrated circuit, etc.), software (e.g., instructions that are executable or can run on a processing device), or a combination thereof. FIG. 7 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure, and some processes can be performed in parallel. In some embodiments, one or more processes can be omitted. Thus, not all processes are required by every embodiment. Additional or alternative process flows are possible.

A computing system can, at 702, receive a bulk document request, wherein the bulk document request comprises request metadata. The bulk document request can be a request to generate and transmit one or more documents to a plurality of recipients. In some examples, request metadata comprises a list of recipients. The request metadata can comprise attribute data for one or more recipients in the list of recipients.

In some examples, the attribute data for a respective recipient can comprise a location of the recipient, an organization of the recipient, and a role of the recipient. Each recipient can be associated with an organization, and the attribute data comprises a location of the organization. In some examples, the request metadata comprises a description of one or more document types to be transmitted to each recipient in the list of recipients.

The computing system can, at 704, access one or more document templates, wherein at least one of the one or more document templates include conditional content. In some examples, each template in the one or more templates has associated metadata. The computing system can, at 706, filter the one or more document templates based on the request metadata. In some examples, the computing system can, for a respective recipient in the plurality of recipients, determine one or more document templates from the one or more document templates associated with the respective recipient based on attribute data associated with the respective recipient.

In some examples, the computing system can determine one or more document types to be sent to the respective recipient based on the description of one or more document types to be transmitted to each recipient in the list of recipients. For each document type to be transmitted to the respective recipient, the computing system can determine one or more document templates with an associated document type that matches the respective document type.

In some examples, the computing system can determine at least one metadata value associated with the respective recipient. The computing system can select a particular document template from the one or more document templates with an associated metadata value that matches the at least one metadata value associated with the respective recipient.

The computing system can, at 708, generate a plurality of documents based on the one or more document templates, wherein each document in the plurality of documents is intended for a particular document recipient in the plurality of document recipients. In some examples, the computing system can evaluate a conditional clause associated with conditional content in at least one document template. The computing system can determine whether to include the conditional content based on the conditional clause.

In some examples, the conditional clause describes a recipient attribute and instructs a document engine to include the conditional content based on an evaluation of one or more attributes associated with the respective recipient. The computing system can determine a document template associated with a respective recipient. The computing system can determine a particular conditional clause within the document template.

The computing system can determine whether an attribute associated with the respective recipient satisfies the conditional clause within the document template. For example, if a conditional clause is associated with a particular country, the computing system can determine whether the recipient is located in (or a citizen of) that country. In accordance with a determination that the attribute associated with the respective recipient satisfies the conditional clause, the computing system can generate an output document that includes the conditional content associated with the conditional clause.

In some examples, the conditional clause can be represented as an independent object that is stored independently from any particular document template. In some examples, a respective document template comprises a reference to the independent object of a particular conditional clause. The computing system can generate, for the satisfied conditional clause, a new immutable object specific to the output document. In some examples, the conditional clause can comprise a nested conditional clause. Once the documents have been fully generated, the computing system can, at 710, transmit the plurality of documents to one or more document recipients.

Numerous details are set forth in the foregoing description. However, it will be apparent to one of ordinary skill in the art having the benefit of this disclosure that the present disclosure may be practiced without these specific details. In some instances, structures and devices are shown in block diagram form, rather than in detail, to avoid obscuring the present disclosure.

Some portions of the detailed description have been presented in terms of processes and symbolic representations of operations on data bits within a computer memory. Here, a process can include a self-consistent sequence of steps leading to a result. The steps can include those requiring physical manipulations of physical quantities. These quantities can take the form of electrical or magnetic signals capable of being stored, transferred, combined, compared, and otherwise manipulated. These signals can be referred to as bits, values, elements, symbols, characters, terms, numbers, or the like.

These terms and similar terms can be associated with physical quantities and can represent labels applied to these quantities. The terms including "obtaining," "parsing," "analyzing," "accessing," "determining," "identifying," "adjusting," "modifying," "transmitting," "receiving," "processing" "generating," or the like, can refer to the actions and processes of a computer system, a computing device, or similar electronic computing device, that manipulates and transforms data represented as physical (e.g., electronic) quantities within the computer system's registers and memories into other data that can be similarly represented as physical quantities within the computer system's memories, registers, or other information storage device, data transmission device, or data processing device.

Certain examples of the present disclosure can relate to an apparatus for performing the operations described herein. This apparatus may include a computing device that is activated or reconfigured by a computer program comprising electronic instructions stored in the computing device. Such a computer program may be stored in a computer readable storage medium, which can include any type of storage. For example, the storage can include hard disk drives, solid state drives, floppy disks, optical disks, CD-ROMs, and magnetic-optical disks, ROMs, RAMs, EPROMs, EEPROMs, magnetic or optical cards, or any type of media suitable for storing electronic instructions.

The above description is intended to be illustrative, and not restrictive. The scope of the disclosure can therefore be determined with reference to the claims.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method, the method comprising receiving a bulk document request, wherein the bulk document request comprises request metadata;

accessing one or more document templates, wherein at least one of the one or more document templates include conditional content;

filtering the one or more document templates based on the request metadata;

generating a plurality of documents based on the one or more document templates, wherein each document in the plurality of documents is intended for delivery to a particular document recipient in one or more document recipients and wherein a respective document in the plurality of documents includes a link to an immutable object associated with a particular outcome for the conditional content in at least one document template in the one or more document templates; and transmitting the plurality of documents to the one or more document recipients.

2. The computer-implemented method of claim 1, wherein the bulk document request is a request to generate and transmit one or more documents to a plurality of recipients.

3. The computer-implemented method of claim 2, wherein the request metadata comprises a list of recipients.

4. The computer-implemented method of claim 3, wherein the request metadata comprises attribute data for one or more recipients in the list of recipients.

5. The computer-implemented method of claim 4, wherein the attribute data for a respective recipient comprises a location of the recipient, an organization of the recipient, and a role of the recipient.

6. The computer-implemented method of claim 5, wherein each recipient is associated with an organization, and the attribute data comprises a location of the organization.

7. The computer-implemented method of claim 6, wherein the request metadata comprises a description of one or more document types to be transmitted to each recipient in the list of recipients.

8. The computer-implemented method of claim 7, wherein each template in the one or more templates has associated metadata.

9. The computer-implemented method of claim 8, wherein filtering the one or more document templates based on the request metadata comprises:

for a respective recipient in the plurality of recipients:

determining one or more document templates from the one or more document templates associated with the respective recipient based on attribute data associated with the respective recipient.

10. The computer-implemented method of claim 9, wherein determining one or more document templates from the one or more document templates associated with the respective recipient based on attribute data associated with the respective recipient further comprises:

determining one or more document types to be sent to the respective recipient based on the description of one or more document types to be transmitted to each recipient in the list of recipients; and for each document type to be transmitted to the respective recipient:

determining one or more document templates with an associated document type that matches the respective document type.

11. The computer-implemented method of claim 10, wherein determining the one or more document templates with an associated document type that matches the respective document type further comprises:

determining at least one metadata value associated with the respective recipient;

selecting a particular document template from the one or more document templates with an associated metadata value that matches the at least one metadata value associated with the respective recipient.

12. The computer-implemented method of claim 11, wherein generating a plurality of documents based on the one or more document templates further comprises:

evaluating a conditional clause associated with conditional content in at least one document template; and determining whether to include the conditional content based on the conditional clause.

13. The computer-implemented method of claim 12, wherein a conditional clause describes a recipient attribute and instructs a document engine to include the conditional content based on an evaluation of one or more attributes associated with the respective recipient.

14. The computer-implemented method of claim 13, wherein generating the plurality of documents comprises:

determining a document template associated with a respective recipient;

determining a particular conditional clause within the document template;

determining whether an attribute associated with the respective recipient satisfies the conditional clause within the document template; and in accordance with a determination that the attribute associated with the respective recipient satisfies the conditional clause, generating an output document that includes the conditional content associated with the conditional clause.

15. The computer-implemented method of claim 14, wherein the conditional clause is represented as an independent object stored independently from any particular document template.

16. The computer-implemented method of claim 15, wherein a respective document template comprises a reference to the independent object of a particular conditional clause.

17. The computer-implemented method of claim 15, wherein generating the output document that includes the conditional content associated with the conditional clause further comprises generating, for the satisfied conditional clause, a new immutable object specific to the output document.

18. The computer-implemented method of claim 15, wherein the conditional clause comprises a nested conditional clause.

19. A computing system comprising one or more processors and memory storing instructions that, when executed, cause the system to perform operations comprising:

receiving a bulk document request, wherein the bulk document request comprises request metadata;

accessing one or more document templates, wherein at least one of the one or more document templates include conditional content;

filtering the one or more document templates based on the request metadata;

generating a plurality of documents based on the one or more document templates, wherein each document in the plurality of documents is intended for delivery to a particular document recipient in one or more document recipients and wherein a respective document in the plurality of documents includes a link to an immutable object associated with a particular outcome for the conditional content in at least one document template in the one or more document templates; and transmitting the plurality of documents to one or more document recipients.

20. A non-transitory computer-readable medium storing instructions that, when executed by a computing system, cause the computing system to perform operations, the operations comprising:

receiving a bulk document request, wherein the bulk document request comprises request metadata;

accessing one or more document templates, wherein at least one of the one or more document templates include conditional content;

filtering the one or more document templates based on the request metadata;

generating a plurality of documents based on the one or more document templates, wherein each document in the plurality of documents is intended for delivery to a particular document recipient in one or more document recipients and wherein a respective document in the plurality of documents includes a link to an immutable object associated with a particular outcome for the conditional content in at least one document template in the one or more document templates; and transmitting the plurality of documents to one or more document recipients.

* * * * *